(12) United States Patent
Ariu (10) Patent No.: US 8,719,036 B2
(45) Date of Patent: May 6, 2014

(54) VOICE DIALOGUE SYSTEM, METHOD, AND PROGRAM

(75) Inventor: Masahide Ariu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 261 days.

(21) Appl. No.: 13/048,193

(22) Filed: Mar. 15, 2011

(65) Prior Publication Data

US 2012/0078634 A1 Mar. 29, 2012

(30) Foreign Application Priority Data

Sep. 29, 2010 (JP) ................................ P2010-219986

(51) Int. Cl.
*G10L 21/00* (2013.01)

(52) U.S. Cl.
USPC ........................................... 704/275; 704/270

(58) Field of Classification Search
CPC ...................... G10L 2015/223; G10L 2015/22; G10L 2015/226; G10L 2015/228; G10L 187/22; G10L 187/24; G10L 15/22; G10L 15/222
USPC .................................. 704/270–278, 231–257
See application file for complete search history.

(56) References Cited

U.S. PATENT DOCUMENTS

| 5,470,233 | A  | * | 11/1995 | Fruchterman et al. ......... 434/112 |
| 7,379,876 | B2 | * | 5/2008  | Nakata ........................... 704/275 |
| 7,516,077 | B2 | * | 4/2009  | Yokoi et al. ................... 704/275 |
| 7,676,370 | B2 | * | 3/2010  | Tanaka .......................... 704/270 |
| 8,219,407 | B1 | * | 7/2012  | Roy et al. ...................... 704/275 |
| 2010/0312547 | A1 | * | 12/2010 | Van Os et al. ..................... 704/9 |
| 2011/0074693 | A1 | * | 3/2011  | Ranford et al. ............... 345/173 |

FOREIGN PATENT DOCUMENTS

| JP | 2002-297374 | 10/2002 |
| JP | 2004-333543 | 11/2004 |
| JP | 2004-354942 | 12/2004 |
| JP | 4060237     | 12/2007 |
| JP | 2009-300696 | 12/2009 |
| JP | 2010-078851 | 4/2010  |

OTHER PUBLICATIONS

Japanese Office Action for Japanese Application No. 2010-219986 mailed on Aug. 31, 2012.

* cited by examiner

*Primary Examiner* — Douglas Godbold
*Assistant Examiner* — Ernest Estes
(74) *Attorney, Agent, or Firm* — Amin, Turocy & Watson, LLP (57) ABSTRACT

A voice dialogue system executing an operation command inputted by a voice dialogue user which stores a history of the number of times each operation is executed. Upon the reception or detection of a voice skip signal during voice input, the system ignores or skips the current voice input and acquires or retrieves an operation name with a high priority based on the history of the number of executions. The acquired operation name is then read aloud by a generation unit.

19 Claims, 8 Drawing Sheets

| OPERATION NAME | OPERATION | NUMBER OF EXECUTION TIMES |
|---|---|---|
| HOME | SET "HOME" TO DESTINATION | 20 |
| PRESENT LOCATION | DISPLAY "PRESENT LOCATION" | 15 |
| APPROVAL | SELECT "YES" | 7 |

FIG. 3

| OPERATION NAME | VOICE DATA |
|---|---|
| OPERATING INSTRUCTIONS | "I EXPLAIN HOW TO USE THIS SYSTEM" |
| HOME | "I SET HOME TO DESTINATION" |
| PRESENT LOCATION | "I DISPLAY PRESENT LOCATION" |
| APPROVAL | "I EXECUTE OPERATION" |

| STATE | OPERATION NAME | OPERATION CONTENT | NUMBER OF EXECUTION TIMES |
|---|---|---|---|
| STATE A | OPERATION A | MAKE A CALL TO 044-549-2412 | 20 |
| | OPERATION B | SET "KOMUKAI TOSHIBA-CHO 1, SAIWAI-KU, KAWASAKI-SHI, KANAGAWA-KEN" TO DESTINATION | 15 |
| | OPERATION C | SEARCH PARKING LOT NEAR "DAISHI 4-48, KAWASAKI-KU, KAWASAKI-SHI, KANAGAWA-KEN" | 10 |
| | OPERATION D | DISPLAY MAP NEAR "SHIBAURA 1, MINATO-KU, TOKYO" | 12 |
| STATE B | OPERATION B | SET "KOMUKAI TOSHIBA-CHO 1, SAIWAI-KU, KAWASAKI-SHI, KANAGAWA-KEN" TO DESTINATION | 15 |
| | OPERATION C | SEARCH PARKING LOT NEAR "DAISHI 4-48, KAWASAKI-KU, KAWASAKI-SHI, KANAGAWA-KEN" | 10 |
| | OPERATION D | DISPLAY MAP NEAR "SHIBAURA 1, MINATO-KU, TOKYO" | 12 |
| STATE C | OPERATION B | SET "KOMUKAI TOSHIBA-CHO 1, SAIWAI-KU, KAWASAKI-SHI, KANAGAWA-KEN" TO DESTINATION | 15 |
| | OPERATION C | SEARCH PARKING LOT NEAR "DAISHI 4-48, KAWASAKI-KU, KAWASAKI-SHI, KANAGAWA-KEN" | 10 |

FIG. 7

| STATE | OPERATION NAME | VOICE DATA (PERIOD DENOTES REFERENCE POINT) |
|---|---|---|
| STATE A | OPERATION A | I MAKE A CALL. 044-549-2412. I MAKE A CALL TO THIS NUMBER. |
| | OPERATION B | I SEARCH ADDRESS. KANAGAWA-KEN. KAWASAKI-SHI. SAIWAI-KU. KOMUKAI TOSHIBA-CHO 1. I SET THIS ADDRESS TO DESTINATION. |
| | OPERATION C | I SEARCH ADDRESS. KANAGAWA-KEN. KAWASAKI-SHI. KAWASAKI-KU. DAISHI 4-48. I SEARCH PARKING LOTS NEAR HERE. |
| | OPERATION D | I SEARCH ADDRESS. TOKYO-TO. MINATO-KU. SHIBAURA 1. I DISPLAY MAP NEAR HERE. |
| STATE B | OPERATION B | KANAGAWA-KEN. KAWASAKI-SHI. SAIWAI-KU. KOMUKAI TOSHIBA-CHO 1. I SET THIS ADDRESS TO DESTINATION. |
| | OPERATION C | KANAGAWA-KEN. KAWASAKI-SHI. KAWASAKI-KU. DAISHI 4-48. I SEARCH PARKING LOTS NEAR HERE. |
| | OPERATION D | TOKYO-TO. MINATO-KU. SHIBAURA 1. I DISPLAY MAP NEAR HERE. |
| STATE C | OPERATION B | SAIWAI-KU. KOMUKAI TOSHIBA-CHO 1. I SET THIS ADDRESS TO DESTINATION. |
| | OPERATION C | KAWASAKI-KU. DAISHI 4-48. I SEARCH PARKING LOTS NEAR HERE. |

VOICE DIALOGUE SYSTEM, METHOD, AND PROGRAM

CROSS-REFERENCE TO RELATED APPLICATION

This application is based upon and claims the benefit of priority from Japanese Patent Application No. P2010-219986, filed on Sep. 29, 2010; the entire contents of which are incorporated herein by reference.

FIELD

Embodiments described herein generally relate to a voice dialogue system, a voice dialogue method, and a voice dialogue program.

BACKGROUND

There is known a voice dialogue system having a dialogue with a user by recognizing a user's input voice, selectively controlling a voice response corresponding to the voice, and outputting the voice response.

It is desired that a voice dialogue system of this type can efficiently have a voice dialogue.

BRIEF DESCRIPTION OF THE DRAWINGS

FIG. 7 is a table showing an operation history stored in a history storage unit 51 according to the second embodiment;

FIG. 8 is a table showing voice data stored in a voice storage unit 52 according to the second embodiment;

DETAILED DESCRIPTION

In order to solve the above problem, a voice dialogue according to embodiments of the present invention, includes a detection unit; an acquisition unit; a generation unit; a history storage unit; and a voice storage unit.

A history storage unit stores an operation name of the operation executed by the voice dialogue system and an operation history corresponding to a number of execution times of the executed operation.

A voice storage unit stores voice data corresponding to the operation name.

A detection unit detects a voice skip signal indicating skipping an user's voice input. An acquisition unit acquires the operation name of the operation having a high priority based on the number of execution time from said history storage unit, when said detection unit detects the voice skip signal.

A generation unit reads the voice data corresponding to the acquired operation name from said voice storage unit, and generates a voice signal corresponding to the read voice data.

(First Embodiment)

A voice dialogue system 1 according to a first embodiment of the present invention is used as, for example, a car navigation system.

The voice dialogue system 1 executes different operations (such as an operation "set user's home to destination" or an operation "display present position") according to contents of user's input voices, respectively. The voice dialogue system 1 stores histories of numbers of execution times of operations executed previously for every operation. The voice dialogue system 1 determines an operation to be executed based on the number of previous execution times of each operation if detecting a voice skip signal that is a signal intended to skip user's voice input. The voice dialogue system 1 executes the operation if the voice skip signal continues to be detected for predetermined time.

Therefore, a user can designate an operation executed by the voice dialogue system 1 without user's inputting a voice as long as the voice dialogue system 1 has performed the operation many times to date.

Figure 1:
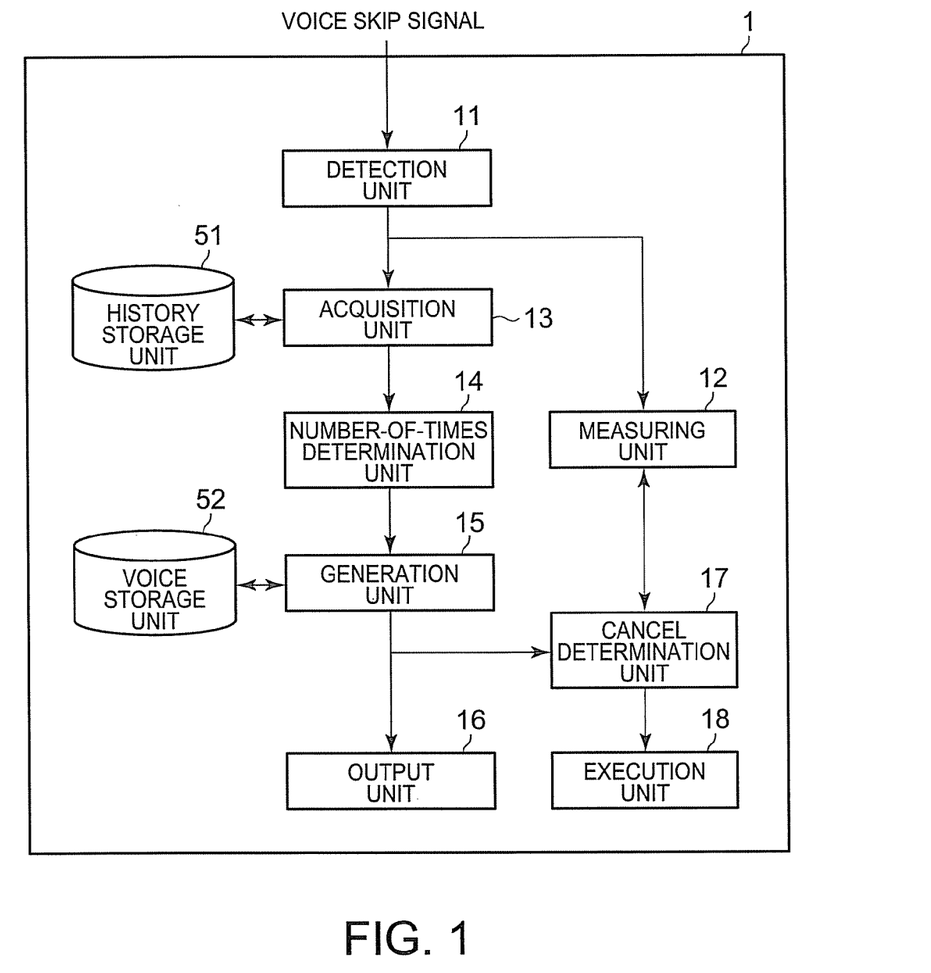
FIG. 1 is a block diagram showing a configuration of a voice dialogue system 1 according to a first embodiment of the present invention.

FIG. 1 is a block diagram showing a configuration of the voice dialogue system 1. The voice dialogue system 1 includes a detection unit 11, a measuring unit 12, an acquisition unit 13, a number-of-times determination unit 14, a generation unit 15, an output unit 16, a cancel determination unit 17, an execution unit 18, a history storage unit 51, and a voice storage unit 52.

The history storage unit 51 stores histories that make operation names of operations executed by the execution unit 18, to be described later, to date correspond to the numbers of execution times of the operations, respectively. The voice storage unit 52 stores voice data corresponding to the respective operation names. The voice storage unit 52 also stores voice data on operating instructions for instructing a method of operating the voice dialogue system 1.

The detection unit 11 detects the voice skip signal. The measuring unit 12 measures a duration of the voice skip signal with time the detection unit 11 detects the voice skip signal set as start time of measurement.

The acquisition unit 13 acquires the operation name of the operation having the largest number of execution times (hereinafter, "largest-number operation") from the history storage unit 51. The acquisition unit 13 also acquires the numbers of execution times of all the operations from the history storage unit 51, and calculates a sum of the numbers of execution times, that is, a total number of execution times. The number-of-times determination unit 14 determines whether or not the total number of execution times is equal to or larger than a predetermined threshold.

If the total number of execution times is equal to or larger than the predetermined threshold, the generation unit 15 reads the voice data corresponding to the largest-number operation from the voice storage unit 52, and generates a voice signal corresponding to the voice data. If the total number of execution times is smaller than the predetermined threshold, the generation unit 15 reads the voice data on the operating instructions from the voice storage unit 52, and generates a voice signal corresponding to the voice data. The output unit 16 outputs one of the voice signals as a voice.

The cancel determination unit 17 determines whether or not the user cancels the voice skip signal by the time the output unit 16 finishes outputting the voice. In the first embodiment, the cancel determination unit 17 determines whether or not the detection unit 11 continues to detect the voice skip signal by the time the output unit 16 finishes outputting the voice while referring to the measuring unit 12. If the detection unit 11 continues to detect the voice skip signal, the execution unit executes either the largest-number operation or the operating-instruction operation.

The detection unit 11, the measuring unit 12, the acquisition unit 13, the number-of-times determination unit 14, the generation unit 15, the output unit 16, the cancel determination unit 17, the execution unit 18, the history storage unit 51, and the voice storage unit 52 may be realized with a central processing unit (CPU) and a memory used in the CPU. Furthermore, the history storage unit 51 and the voice storage unit 52 may be realized with an auxiliary storage device.

Figure 2:
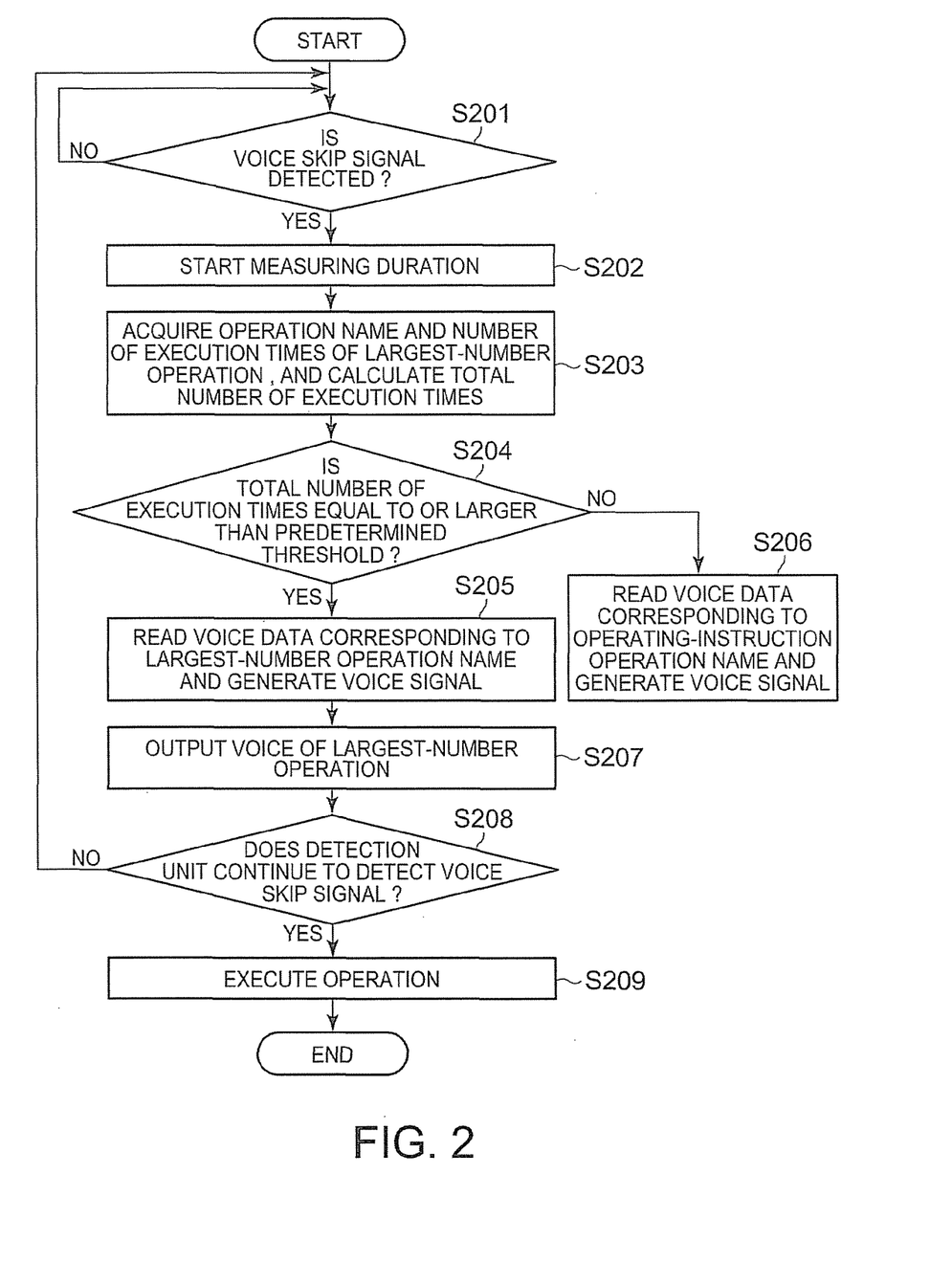
FIG. 2 is a flowchart showing processing performed by the voice dialogue system 1.

FIG. 2 is a flowchart showing processing performed by the voice dialogue system 1. The detection unit 11 determines whether or not the voice skip signal is detected (S201). For example, the detection unit 11 may determine whether or not the voice skip signal is detected by determining whether or not the user depresses a speech button (a button which the user depresses when the user inputs a voice by producing sound) (not shown) for predetermined time.

Alternatively, the detection unit 11 may determine whether or not the voice skip signal is detected, by determining whether or not the user depresses the speech button a predetermined number of times or larger per unit time. In another alternative, the detection unit 11 may determine that the voice skip signal is detected if the user turns his/her gaze in a predetermined direction for predetermined time using a well-known technique for detecting user's gaze.

It is preferable that the detection unit 11 can also detect the end of the voice skip signal. That is, the detection unit 11 can preferably determine the end of the voice skip signal by detecting re-depression of the speech button, the end of the depression of the speech button which the user depresses for the predetermined time or longer, the fact that the user does not depress the speech button the predetermined times or larger per unit time, or the fact that the user turns his/her gaze in the direction other than the predetermined direction using an imaging device or the like.

If a determination result is NO in step S201, the detection unit 11 performs processing in step S201 until the voice skip signal is detected.

If the determination result is YES in step S201, the measuring unit 12 starts measuring the duration of the voice skip signal since the start time with the time when the detection unit 11 determines that the voice skip signal is input set as the start time (S202).

Figure 3:
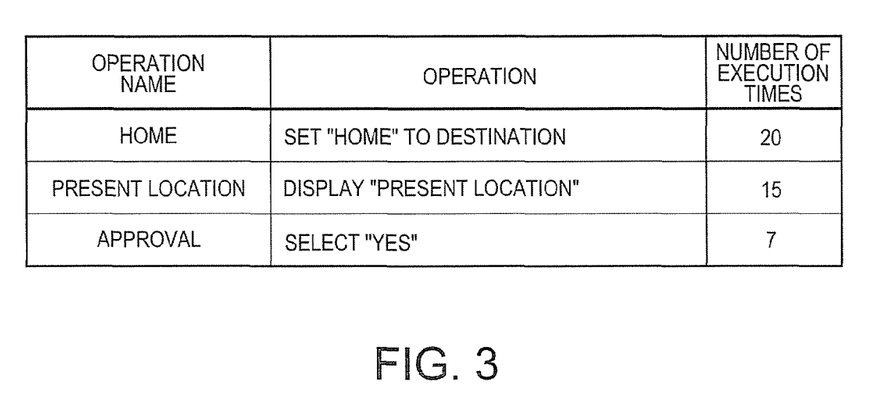
FIG. 3 is a table showing an operation history stored in a history storage unit 51 according to the first embodiment.

FIG. 3 is a table showing the operation histories stored in the history storage unit 51. As shown in FIG. 3, the history storage unit 51 stores the operation names for identifying the operations, the operations corresponding to the operation names, and the number of execution times of the operations to date while making the operation names, the operations, and the numbers of execution times correspond to one another, respectively. It is to be noted, however, the operating-instruction operation is not stored in the history storage unit 51 since the number of execution times of the operating-instruction operation is not counted.

The acquisition unit 13 reads the operation name of the largest-number operation and the number of execution time of the largest-number operation from the history storage unit 51 (S203). At this time, the acquisition unit 13 calculates the total number of execution times. In an example of FIG. 3, the operation name of the largest-number operation is "home". Therefore, the acquisition unit 13 reads the operation name "home" and the number of execution times "20" from the history storage unit 51. Furthermore, the acquisition unit 13 sums up the numbers of execution times of the respective operations ("home", "present location", and "approval") to calculate the total number of execution times (42 (20+15+7)).

Although FIG. 3 shows only three operations, if a recognition unit (not shown) recognizing a user's voice recognizes the user's voice and the execution unit 18 executes a new operation, the execution unit 18 may additionally write the new operation into the history storage unit 51. Further, if the execution unit 18 executes one of the operations already stored in the history storage unit 51, the cancel determination unit 17 may increment the number of execution times of the operation.

The number-of-times determination unit 14 determines whether or not the total number of execution times is equal to or larger than the predetermined threshold (S204). The predetermined threshold may be set in advance. In the example, the predetermined threshold is set to "10".

If a determination result is YES in step S204, the generation unit 15 reads the voice data corresponding to the largest-number operation from the voice storage unit 52 and generates the voice signal corresponding to the voice data (S205). If the determination result is NO in step S204, the generation unit 15 reads the voice data corresponding to the operating-instruction operation from the voice storage unit 52 and generates the voice signal corresponding to the voice data (S206).

Figure 4:
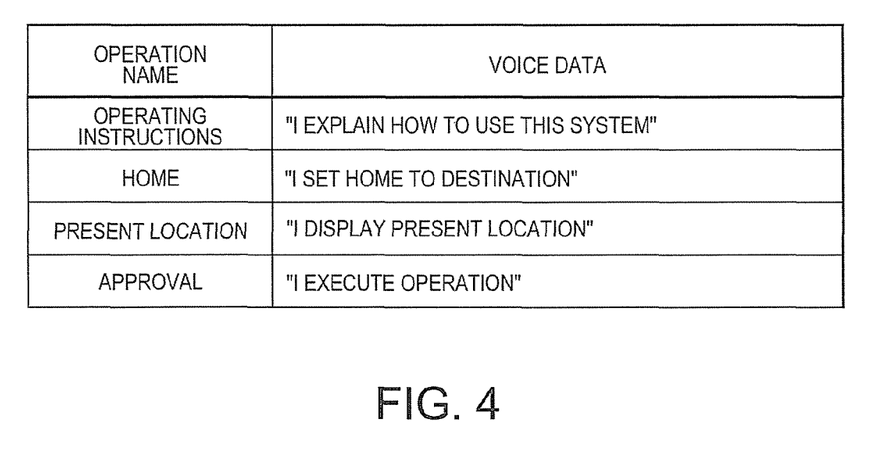
FIG. 4 is a table showing voice data stored in a voice storage unit 52 according to the first embodiment.

FIG. 4 is a table showing the voice data stored in the voice storage unit 52. The voice storage unit 52 stores the voices to be output while making the voices correspond to the operation names of the respective operations.

In this embodiment, the total number of execution times is 42. Therefore, the determination result is YES in step S204. Accordingly, the generation unit 15 reads the voice data "set user's home to destination" corresponding to the largest-number operation "home" from the voice storage unit 52, and generates the voice signal corresponding to the voice data.

It is to be noted that the voice data may be stored in the form of a character data string. In this case, the generation unit 15 may generate the voice signal from the character data string using a well-known voice synthesis technique.

The generation unit 15 supplies the voice signal to the output unit 16. The output unit 16 outputs the voice signal as a voice (S207).

The cancel determination unit 17 determines whether or not the detection unit 11 continues to detect the voice skip signal at the time the output unit 16 finishes outputting the voice signal while referring to the measuring unit 12 (S208). If a determination result is YES in step S208, the execution unit 18 executes the largest-number operation or the operating-instruction operation (S209). In the example, the execution unit 18 executes the operation "set user's home to destination". If the determination result is NO in step S208, the execution unit 18 moves to step S201 without executing the largest-number operation or the operating-instruction operation.

It is to be noted that the cancel determination unit 17 may determine whether or not the detection unit 11 continues to detect the voice skip signal after passage of predetermined time since the output unit 16 finishes outputting the voice signal while referring to the measuring unit 12.

While the acquisition unit 13 acquires the operation name of the largest-number operation and the number of execution times of the largest-number operation and calculates the total number of execution times in this embodiment, the acquisition unit 13 may acquire only the operation name of the largest-number operation and supply the operation name to the generation unit 15.

Moreover, in this embodiment, the acquisition unit 13 may set a weight to the number of execution times stored as each history and determine the largest-number operation using "(weight)×(the number of execution times)" at the time of determining the largest number of execution times. This weight may be given according to every operation in advance or obtained by a distance function between the corresponding operation and the present location (either a physical distance or a cost, a method of acquiring the distance is assumed to be realized by a well-known technique).

Alternatively, in this embodiment, the acquisition unit 13 may acquire a plurality of operation names and the numbers of execution times of operations corresponding to the respective operation names in descending order of the numbers of execution times. An embodiment of the determination made by the number-of-times determination unit 14 will be described later.

Furthermore, in this embodiment, the number-of-times determination unit 14 as well as the generation unit 15 execute steps S204 to S206 shown in FIG. 2 based on the total number of execution times of the operations stored in the history storage unit 51. However, the determination is not limited to that based on the total number of execution times. If the acquisition unit 13 acquires a plurality of operation names and the numbers of execution times of operations corresponding to the respective operation names in descending order of the numbers of execution times as stated above, the number-of-times determination unit 14 may make the determination by determining whether or not a difference between the largest number of execution times and the second largest number of execution times is greater than a preset threshold. In this case, the number-of-times determination unit 14 determines whether the difference between the largest number and the second largest number is equal to or greater than the preset threshold (a step corresponding to S204). If a determination result is YES, the processing goes to generation of the voice signal indicating the voice data corresponding to the largest-number operation (a step corresponding to S205). If the determination result is NO, it is considered to perform an operation "there is no operation corresponding to the voice skip signal" instead of the operating instructions, that is, to promote an ordinary operation to be performed without performing the processing using the voice skip signal (a step changed from S206). In either way, it suffices that the number-of-times determination unit 14 makes the determination based on the numbers of execution times of the respective operations stored in the history storage unit 51.

According to this embodiment, the user can cause the voice dialogue system 1 to execute the user's intended operation by continuing to input the voice skip signal if the voice dialogue system 1 outputs a voice corresponding to a content of the user's intended operation. This can dispense with a voice dialogue. Further, while presenting the user with the operation determined from the number of previous execution times by a voice, the user can inform the voice dialogue system 1 of the determination as to whether or not the voice dialogue system 1 can perform the operation determined by continuing to input the voice skip signal while listening to the voice. That is, it is possible to designate the operation performed by the voice dialogue system 1 without user's inputting a voice as long as the voice dialogue system 1 frequently performs the operation.

Moreover, in this embodiment, the instance of finishing inputting the voice skip signal by user's inputting the voice skip signal using one speech button and then releasing the speech button has been described. However, the present invention is not limited to this instance. For example, the voice dialogue system 1 may include a first button (not shown) for inputting the voice skip signal and a second button (not shown) for canceling input of the voice skip signal.

In this alternative, the measuring unit 12 may measure the duration since depression of the first button until depression of the second button. In this case, the user inputs the voice skip signal by depressing the first button. If the voice output from the output unit 16 indicates a content of a user's unintended operation, the user depresses the second button.

The user can thereby inform the voice dialogue system 1 of the determination as to whether or not the voice dialogue system 1 can perform the determined operation.

(Second Embodiment)

A voice dialogue system 2 according to a second embodiment of the present invention differs from the voice dialogue system 1 according to the first embodiment in that an operation for the voice skip signal can be determined according to a "dialogue state" showing a progress state of a dialogue with the user.

Figure 5:
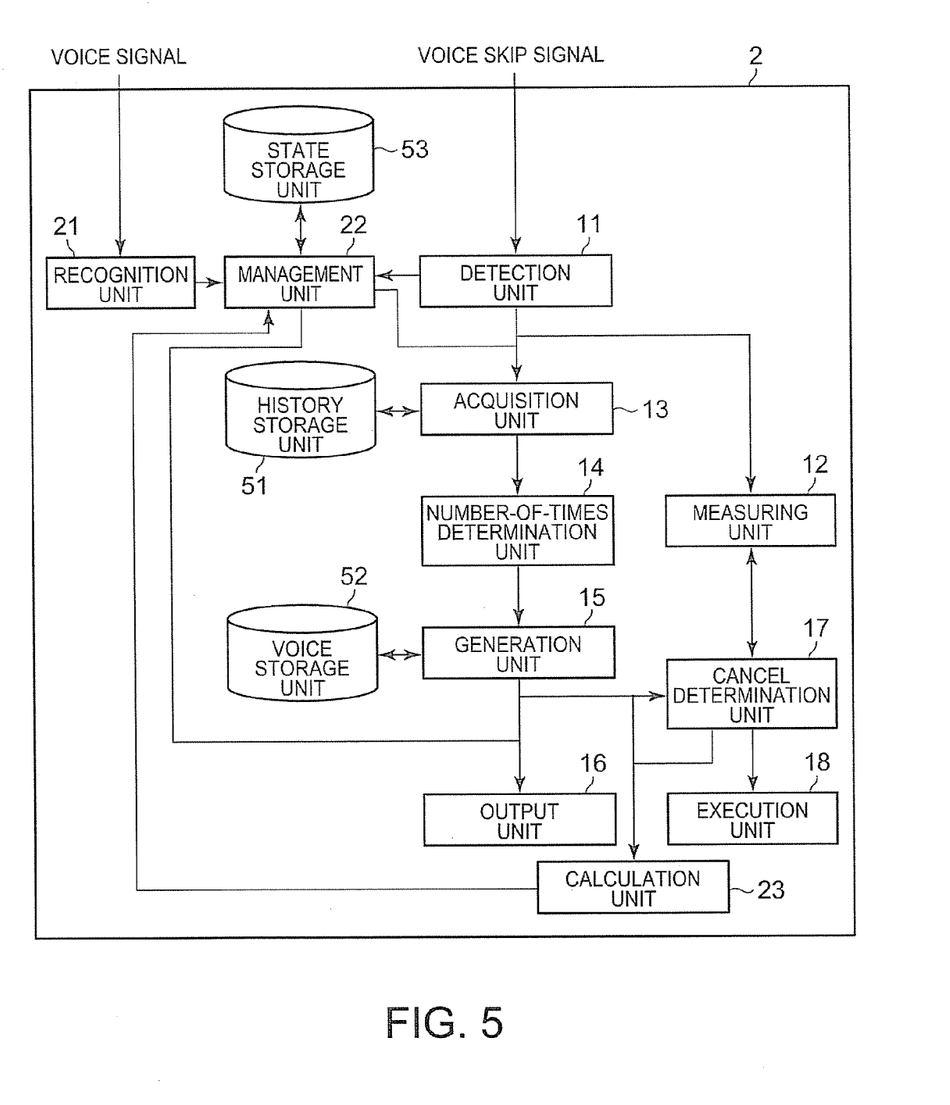
FIG. 5 is a block diagram showing a configuration of a voice dialogue system 2 according to a second embodiment of the present invention.

FIG. 5 is a block diagram of the voice dialogue system 2. The voice dialogue system 2 additionally includes a recognition unit 21, a management unit 22, a calculation unit 23, and a state storage unit 53 as compared with the voice dialogue system 1 according to the first embodiment. The voice dialogue system 2 further differs from the voice dialogue system 1 in that the history storage unit 51 and the voice storage unit store different contents. Besides, the voice dialogue system 2 differs from the voice dialogue system 1 in that the cancel determination unit 17 makes a determination further using a reference point (to be described later) for voice output.

The recognition unit 21 recognizes a user's voice (voice signal) input through a microphone (not shown). The state storage unit 53 stores a current state of a dialogue between the user and the system. The management unit 22 manages the current state of the dialogue between the user and the system using the state storage unit 53. The calculation unit 23 calculates a voice output from the output unit 16 when the detection unit 11 does not detect the voice skip signal based on information on the "reference point", which will be described later in detail.

Figure 6:
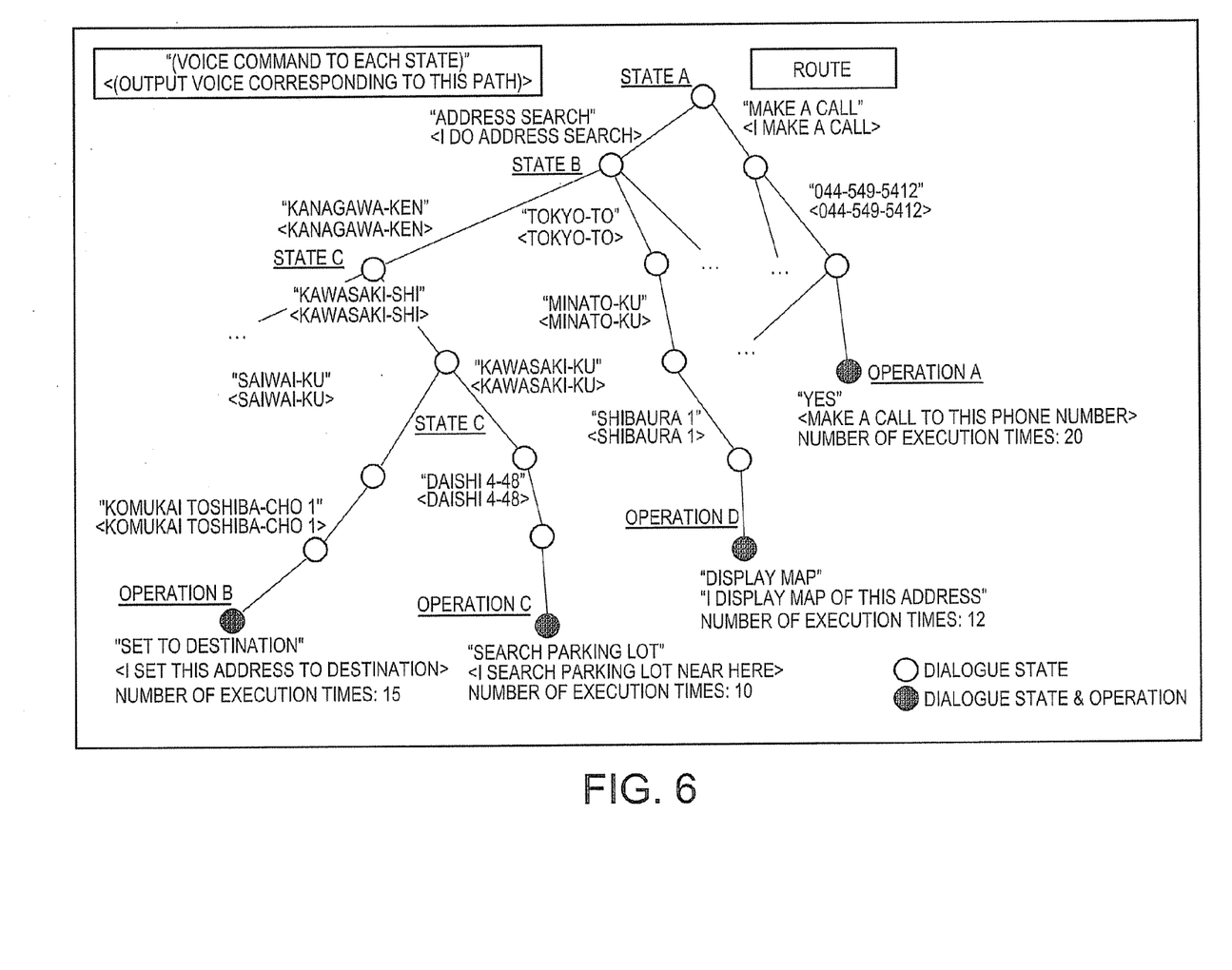
FIG. 6 is a conceptual diagram for describing "dialogue states" according to the second embodiment.

The "dialogue state" will be described. FIG. 6 is a conceptual diagram for describing the "dialogue state" according to this embodiment. In FIG. 6, the voice dialogue system as a car navigation system will be described by way of example. In FIG. 6, a white circle (?) denotes the "dialogue state". For description purposes, a tree structure expresses the dialogue state in FIG. 6.

The state storage unit 53 stores the dialogue state. The management unit 22 manages the dialogue state using the state storage unit 53.

It is assumed herein that the dialogue state is a state "route" (state A) at start of an initial dialogue. In this state, if the user produces a sound "address search" or "make a call", the recognition unit 21 makes voice recognition. The management unit 22 moves the current dialogue state to a state according to each recognition result (for example, a state B if the user utters "address search").

FIG. 6 also shows other operation states than the dialogue state. For example, as for a state "operation B" in FIG. 6, the user can reach the state "operation B" by producing sounds "search address"→"Kanagawa-ken"→"Kawasaki-shi"→"Saiwai-Ku"→"Komukai Toshiba-cho 1"→"Set to destination". The operation is one for setting a location of "Komukai Toshiba-cho 1, Saiwai-ku, Kawasaki-shi, Kanawaga-ken" to a destination of the car navigation system. A content of each angled bracket (< >) shown in FIG. 6 represents a content of the voice output from the output unit 16 at the time of transition to the state.

Moreover, the number of execution times of the operation stored in the history storage unit 51 is described in the state of each operation shown in FIG. 6. For example, the number of execution times of the operation corresponding to the operation B is described as 15.

The history storage unit 51 according to this embodiment differs from that according to the first embodiment in that the history storage unit 51 can store a history of each dialogue state. FIG. 7 is a table showing operation histories stored in the history storage unit 51 according to this embodiment. The history storage unit 51 stores one or a plurality of operations performed for each state (A, B, C or the like) and the number of execution times of each operation.

FIG. 8 is a table showing voice data stored in the voice storage unit 52 according to this embodiment. The voice storage unit 52 stores each state, an operation name or operation names of one or a plurality of operations that can be executed in the state, and voice data on each operation while making the state, the operation name or operation names, and the voice data correspond to one another. The voice storage unit 52 stores a string of voices output by transition of operations in each state as contents of the voice data in the state.

Furthermore, the voice storage unit 52 may store reference points representing what states the output unit 16 currently outputs, respectively as an element of the voice data. In FIG. 8, periods represent reference points, respectively. Each reference point may own information on the corresponding "dialogue state". By allowing each reference point to own the information on the corresponding dialogue state, the voice dialogue system 2 can move the dialogue state to the corresponding dialogue state using the management unit 22. In the second embodiment, the voice dialogue system 2 is described to the effect that each reference point corresponds to each state shown in FIG. 6 with reference to FIGS. 6 and 8. Therefore, it is assumed that a dialogue state corresponding to each reference point shown in FIG. 8 is present though not explicitly shown therein.

Figure 9:
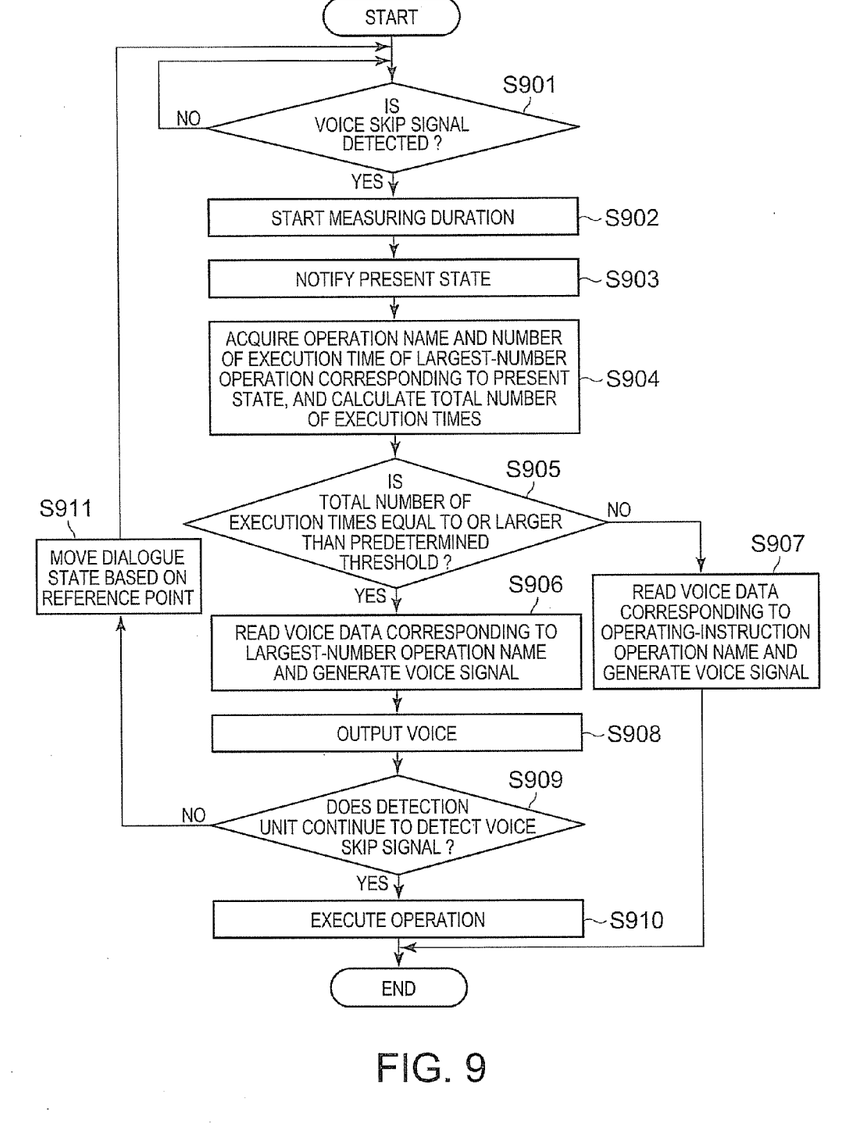
FIG. 9 is a flowchart showing processing performed by the voice dialogue system 2 according to the second embodiment.

FIG. 9 is a flowchart showing processing performed by the voice dialogue system 2. The detection unit 11 determines whether or not the voice skip signal is detected (S901). If a determination result is NO in step S901, the detection unit 11 repeatedly performs the processing in step S901 until the voice skip signal is detected.

If the determination result is YES in step S901, the measuring unit 12 starts measuring a duration of the voice skip signal after start time with the time the detection unit 11 determines that the voice skip signal is input set as the start time (S902).

The management unit 22 reads the dialogue state at the time the voice skip signal is detected from the state storage unit 53 and notifies the acquisition unit 13 of the dialogue state (S903). For example, if the dialogue state at the time the voice skip signal is detected is a "state B", the management unit 22 notifies the acquisition unit 13 that the present dialogue state is the "state B".

The acquisition unit 13 acquires the operation name of the operation having the largest number of execution times ("largest-number operation") among all the operations corresponding to the notified state and the number of execution times of the largest-number operation while referring to the history storage unit 51. In addition, the acquisition unit 13 calculates the total number of execution times that is a sum of numbers of execution times of all the operations corresponding to the notified state (S904).

For example, the acquisition unit 13 acquires the largest-number operation "operation B" out of the operations corresponding to the "operation B" and the number of execution time "15" of the "operation B" while referring to the history storage unit 51. In addition, the acquisition unit 13 calculates the total number of execution times (37 (15+10+12)) of all the operations corresponding to the "state B".

The number-of-times determination unit 14 determines whether or not the total number of execution times is equal to or larger than a predetermined threshold (S905). The predetermined threshold may be set in advance. In this embodiment, the predetermined threshold is set to "10".

If a determination result is YES in step S905, the generation unit 15 reads voice data corresponding to the largest-number operation from the voice storage unit 52 and generates a voice signal indicating the voice data (S906). If the determination result is NO in step S905, the generation unit 15 reads voice data corresponding to the operating-instruction operation from the voice storage unit 52 and generates a voice signal indicating the voice data (S907). The output unit 16 outputs the voice signal as a voice (S908).

The cancel determination unit 17 determines whether or not the voice skip signal continues to be detected at the time the output unit 16 finishes outputting the voice signal by referring to the measuring unit 12 (S909). If a determination result is YES in step S909, the execution unit 18 executes either the largest-number operation or the operating-instruction operation (S910). In this embodiment, the execution unit 18 executes the operation "set 'Komukai Toshiba-cho 1, Saiwai-ku, Kawasaki-shi, Kanawaga-ken' to destination".

If the determination result is NO in step S909, the calculation unit 23 calculates a voice output from the output unit 16 at the time detection of the voice skip signal is finished based on the position of the reference point, and notifies the management unit 22 of the voice. The management unit 22 moves the present dialogue state to a state corresponding to the voice and updates the state storage unit 53 (S911).

Figure 10:
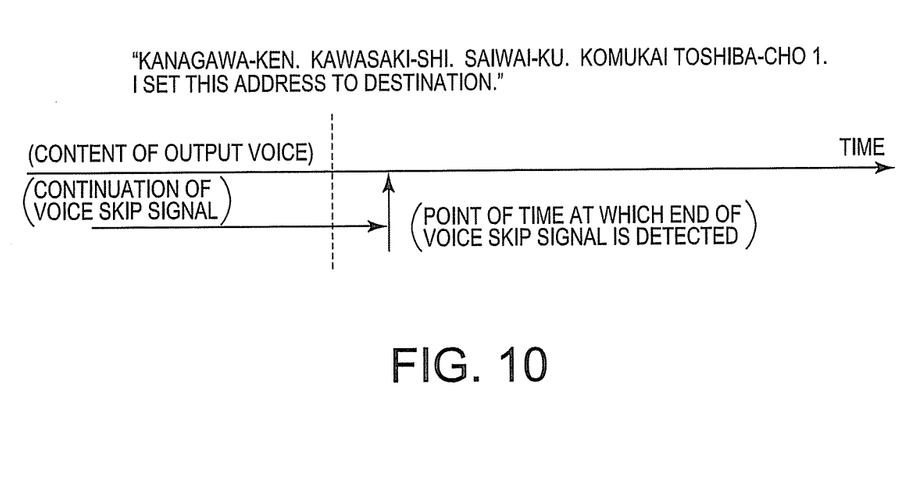
FIG. 10 is a diagram for describing processing performed by a calculation unit 23.

The calculation unit 23 will be described. FIG. 10 is a diagram for describing processing performed by the calculation unit 23. For example, it is assumed that the content of the output voice is "Kanawaga-ken. Kawasaki-shi. Saiwai-ku. Komukai Toshiba-cho 1. I set this address to destination" (every period represents a reference point). It is also assumed that the detection of the voice skip signal is finished near "Saiwai-ku" halfway along the output of this voice from the output unit 16. That is, this processing corresponds to user's canceling the voice skip signal at this point since the voice output after "Kawasaki-shi" is not "Kawasaki-ku" but "Saiwai-ku" even though the user intends to allow the system to perform an "operation C".

At this time, the determination is NO in step S909, so that the calculation unit 23 extracts the reference point right before the time of the end of the detection of the voice skip signal. This can be realized by managing what reference point is currently the latest among those passed through previously at each time of the voice that is being output. In this way, the calculation unit 23 can calculate the reference point just before the end of the voice skip signal.

Furthermore, it is described that the calculation unit extracts the reference point just before the time the detection of the voice skip signal is finished. Alternatively, a predetermined buffer may be provided. In this alternative, if a length from the time the detection of the voice skip signal is finished to the reference point just before the time is equal to or shorter than predetermined time, the calculation unit 23 can extract the reference point one point before. It is thereby possible to consider the time since the user hears the output voice until the content is determined.

The voice dialogue system 2 according to this embodiment can determine the operation to be executed according to each dialogue state by managing the dialogue state.

The above embodiment enables the voice dialogue system to efficiently have a voice dialogue.

Moreover, the acquisition unit 13 may acquire the operation name of the operation having the largest number of execution times (largest-number operation) and the operation name of the operation having the second largest number of execution times (hereinafter, "second operation") out of all the operations corresponding to the notified state, and the number of execution times of these operations while referring to the history storage unit 51 as described in the first embodiment.

In this case, the recognition unit 11 is assumed to recognize a voice corresponding to the voice data on the second operation (this recognition can be realized by a well-known voice recognition technique). If the voice corresponding to the voice data on the largest-number operation output from the output unit 16 is not the user's intended voice, the user may correct the operation executed by the execution unit 18 from the largest-number operation to the second operation by producing the voice corresponding to the second operation. The user can thereby change the operation executed by the execution unit 18 using the voice.

While several embodiments according to the present invention have been described so far, these embodiments are given for illustrating purposes only do not intend to the scope of the invention. These new embodiments can be carried out in the other fashion and various omissions, replacement and change can be made of the embodiments without departure of the scope of the invention. These embodiments and modifications of the embodiments are included in the scope of the invention and Abstract and included in an equivalent scope to that of the invention described in claims.

What is claimed is:

1. A voice dialogue system executing an operation by a voice dialogue with a user, by recognizing a user's input voice and outputting a voice response corresponding the user's input voice, comprising:
   a history storage unit storing an operation name of an operation executed by the voice dialogue system and an operation history corresponding to a number of execution times of the executed operation;
   a voice storage unit storing voice data corresponding to the operation name;
   an input unit, comprising at least one of a button unit or a gaze detection unit, inputting a voice skip signal that is intended, by the user, to skip a user's voice input;
   a detection unit detecting the voice skip signal inputted by said input unit;
   an acquisition unit acquiring the operation name of the operation having a high priority, based on a weighted largest number of execution times from said history storage unit, when said detection unit detects the voice skip signal; and
   a generation unit reading the voice data corresponding to the acquired operation name from said voice storage unit, and generating a voice signal corresponding to the read voice data.

2. The voice dialogue system according to claim 1, wherein said input unit inputting the voice skip signal at a time when the voice dialog system outputs the voice response corresponding the user's input voice.

3. The voice dialogue system according to claim 1, further comprising,
   an output unit converting the voice signal into a voice, and outputting the voice.

4. The voice dialogue system according to claim 3, further comprising,
   a cancel determination unit determining whether the voice skip signal is cancelled before output of the voice is finished; and
   an execution unit executing the operation corresponding to the operation name when the voice skip signal is not cancelled.

5. The voice dialogue system according to claim 4, wherein said button unit generates the voice skip signal in a depressed state, and does not generate the voice skip signal in a non-depressed state.

6. The voice dialogue system according to claim 4, wherein said cancel determination unit determines whether the voice skip signal is cancelled before the output of the voice is finished based on a continuous detection of the voice skip signal by said detection unit.

7. The voice dialogue system according to claim 6, further comprising,
   a measuring unit measuring a duration of the voice skip signal from a time beginning when said detection unit starts to detect the voice skip signal,
   wherein said cancel determination unit determines whether the voice skip signal is continued at a time when the output of the voice is finished based on the duration.

8. A voice dialogue system executing an operation by a voice dialogue with a user, by recognizing a user's input voice and outputting a voice response corresponding the user's input voice, comprising:
   a history storage unit storing an operation name of an operation executed by the voice dialogue system and an operation history corresponding to a number of execution times of the executed operation;
   a voice storage unit storing voice data corresponding to the operation name;
   an input unit, comprising at least one of a button unit or a gaze detection unit, inputting a voice skip signal that is intended, by the user, to skip a user's voice input;
   a detection unit detecting the voice skip signal inputted by said input unit;
   an acquisition unit acquiring the operation name of the operation having a high priority based on a weighted largest number of execution times from said history storage unit, when said detection unit detects the voice skip signal;
   a generation unit reading the voice data corresponding to the acquired operation name from said voice storage unit, and generating a voice signal corresponding to the read voice data;
   an output unit converting the voice signal into a voice, and outputting the voice;
   an execution unit executing the operation corresponding to the operation name when the voice skip signal is not cancelled;
   a measuring unit measuring a duration of the voice skip signal from a time beginning when said detection unit starts to detect the voice skip signal;
   a cancel determination unit determining:
      whether the voice skip signal is cancelled before output of the voice is finished based on a continuous detection of the voice skip signal by said detection unit; or whether the voice skip signal is continued at a time when the output of the voice is finished based on the duration;

wherein said acquisition unit acquires the number of execution times of the operation from said history storage unit and calculates a total number of execution times that is a sum of the number of execution times when the detection unit detects the voice skip signal, said acquisition unit further includes a number-of-times determination unit determining whether the total number of execution times is equal to or smaller than a predetermined threshold, and wherein said execution unit executes the operation corresponding to the operation name if a determination of said number-of-times determination unit is true.

9. A voice dialogue system executing an operation by a voice dialogue with a user, by recognizing a user's input voice and outputting a voice response corresponding the user's input voice, comprising:

a history storage unit storing an operation name of an operation executed by the voice dialogue system and an operation history corresponding to a number of execution times of the executed operation;

a voice storage unit storing voice data corresponding to the operation name;

an input unit, comprising at least one of a button unit or a gaze detection unit, inputting a voice skip signal that is intended, by the user, to skip a user's voice input;

a detection unit detecting the voice skip signal inputted by said input unit;

an acquisition unit acquiring the operation name of the operation having a high priority, that is determined based on a weighted largest number of execution times, from said history storage unit, when said detection unit detects the voice skip signal;

a generation unit reading the voice data corresponding to the acquired operation name from said voice storage unit, and generating a voice signal corresponding to the read voice data;

an output unit converting the voice signal into a voice, and outputting the voice;

a cancel determination unit determining whether the voice skip signal is cancelled before output of the voice is finished;

an execution unit executing the operation corresponding to the operation name when the voice skip signal is not cancelled; and a management unit that transitions the dialogue state to a state corresponding to the voice data on a voice output from the output unit at a time when said detection unit finishes detecting the voice skip signal; wherein said voice storage unit stores the voice data which is made to correspond with a dialogue state.

10. A voice dialogue method for executing an operation by a voice dialogue with a user, comprising:

storing an operation name of an operation executed by the voice dialogue system and an operation history corresponding to a number of execution times of the executed operation, by a history storage unit;

storing voice data corresponding to the operation name by a voice storage unit;

detecting a voice skip signal indicating a skipping of a user's voice input by a detection unit;

inputting a voice skip signal that is intended, by the user, to skip a user's voice input, by an input unit, wherein the input unit comprises at least one of a button unit or gaze detection unit;

recognizing a user's input voice, by a recognition unit, and outputting a voice response corresponding the user's input voice, by an output unit;

acquiring the operation name of the operation having a high priority, that is determined based on a weighted largest of execution times, from the history storage unit, when the detection unit detects the voice skip signal, by an acquisition unit; and reading the voice data corresponding to the acquired operation name from said voice storage unit, and generating a voice signal corresponding to the read voice data, by a generation unit.

11. The voice dialogue method according to claim 10, further comprising, converting the voice signal into a voice, and outputting the voice by an output unit.

12. The voice dialogue method according to claim 11, further comprising, determining whether the voice skip signal is cancelled before output of the voice is finished, by a cancel determination unit; and executing the operation corresponding to the operation name when the voice skip signal is not cancelled, by an execution unit.

13. The voice dialogue method according to claim 12, wherein said button unit generates the voice skip signal in a depressed state, and does not generate the voice skip signal in a non-depressed state.

14. The voice dialogue method according to claim 12, wherein said step of determining whether the voice skip signal is cancelled before the output of the voice is finished is based on a continuous detection of the voice skip signal, by the cancel determination unit.

15. The voice dialogue method according to claim 14, further comprising, measuring a duration of the voice skip signal from a time beginning when said detection unit starts to detect the voice skip signal, by a measuring unit, wherein the cancel determination unit determines whether the voice skip signal is continued at a time when the output of the voice is finished based on the duration.

16. A voice dialogue method for executing an operation by a voice dialogue with a user, comprising:

storing an operation name of an operation executed by the voice dialogue system and an operation history corresponding to a number of execution times of the executed operation, by a history storage unit;

storing voice data corresponding to the operation name by a voice storage unit;

detecting a voice skip signal indicating a skipping of a user's voice input by a detection unit;

acquiring the operation name of the operation having a high priority, that is based on a weighted largest number of execution times, from the history storage unit, when the detection unit detects the voice skip signal, by an acquisition unit;

reading the voice data corresponding to the acquired operation name from said voice storage unit, and generating a voice signal corresponding to the read voice data, by a generation unit;

converting the voice signal into a voice, and outputting the voice by an output unit;

determining whether the voice skip signal is cancelled before output of the voice is finished, by a cancel determination unit, based on a continuous detection of the voice skip signal;

executing the operation corresponding to the operation name when the voice skip signal is not cancelled, by an execution unit, measuring a duration of the voice skip signal from a time beginning when said detection unit starts to detect the voice skip signal, by a measuring unit, when it is determined, by the cancel determination unit, that the voice skip signal is continued at a time when the output of the voice is finished based on the duration;

the number of execution times of the operation from said history storage unit and calculating a total number of execution times that is a sum of the number of execution times when the detection unit detects the voice skip signal, by the acquisition unit; and determining whether the total number of execution times is equal to or smaller than a predetermined threshold by a number-of-times determination unit, and executing the operation corresponding to the operation name if said number-of-determination unit determines that the total number of execution times is equal to or larger than the predetermined threshold, by said execution unit.

17. A voice dialogue method for executing an operation by a voice dialogue with a user, comprising:

storing an operation name of an operation executed by the voice dialogue system and an operation history corresponding to a number of execution times of the executed operation, by a history storage unit;

storing voice data, which is made to correspond to a dialogue state, corresponding to the operation name, by a voice storage unit;

detecting a voice skip signal indicating a skipping of a user's voice input by a detection unit;

acquiring the operation name of the operation having a high priority, that is determined based on a largest execution times from the history storage unit, when the detection unit detects the voice skip signal, by an acquisition unit;

reading the voice data corresponding to the acquired operation name from said voice storage unit, and generating a voice signal corresponding to the read voice data, by a generation unit;

converting the voice signal into a voice, and outputting the voice by an output unit;

determining whether the voice skip signal is cancelled before output of the voice is finished, by a cancel determination unit;

executing the operation corresponding to the operation name when the voice skip signal is not cancelled, by an execution unit; and transitioning a dialogue state to a state corresponding to the voice data on a voice output from the output unit at the time when said detection unit finishes detecting the voice skip signal.

18. A non-transitory computer readable storage medium comprising computer executable instructions that in response to execution, cause a computing system to perform operations, comprising:

storing an operation name of the operation executed by a voice dialogue system and an operation history corresponding to a number of execution times of the executed operation;

storing voice data corresponding to the operation name;

detecting a voice skip signal indicating a skipping of a user's voice input;

acquiring the operation name of the operation having a high priority defined by a weighted largest number of execution time based on the stored operation history, when the voice skip signal is detected; and reading the voice data corresponding to the acquired operation name based on the stored voice data, and generates a voice signal corresponding to the read voice data.

19. The voice dialogue program according to claim 18, further comprising, converting the voice signal into a voice, and outputting the voice;

determining whether the voice skip signal is cancelled before output of the voice is finished; and executing the operation corresponding to the operation name when the voice skip signal is not cancelled.

* * * * *